United States Patent
Derclaye

(10) Patent No.: US 9,611,747 B2
(45) Date of Patent: Apr. 4, 2017

(54) GUIDE VANE ASSEMBLY VANE BOX OF AN AXIAL TURBINE ENGINE COMPRESSOR

(71) Applicant: Techspace Aero S.A., Herstal (Milmort) (BE)

(72) Inventor: Alain Derclaye, Couthuin (BE)

(73) Assignee: Safran Aero Boosters SA (BE)

( * ) Notice: Subject to any disclaimer, the term of this patent is extended or adjusted under 35 U.S.C. 154(b) by 0 days.

(21) Appl. No.: 14/792,089

(22) Filed: Jul. 6, 2015

(65) Prior Publication Data

US 2016/0003073 A1 Jan. 7, 2016

(30) Foreign Application Priority Data

Jul. 7, 2014 (EP) ..................................... 14175924

(51) Int. Cl.
*F04D 9/04* (2006.01)
*F01D 9/04* (2006.01)

(52) U.S. Cl.
CPC ............. *F01D 9/041* (2013.01); *F01D 9/042* (2013.01); *F05D 2260/36* (2013.01); *F05D 2300/174* (2013.01); *F05D 2300/6033* (2013.01)

(58) Field of Classification Search
CPC ..... F01D 9/00; F01D 9/02; F01D 9/04; F01D 25/246; F01D 25/28; F01D 9/042; F01D 9/044; F01D 9/047; F05D 2240/80
USPC ....................................................... 415/209
See application file for complete search history.

(56) References Cited

U.S. PATENT DOCUMENTS

| 2,857,093 | A | * | 10/1958 | Warnken | F01D 9/042 415/200 |
| 3,326,523 | A | * | 6/1967 | Bobo | F01D 9/042 415/209.3 |
| 3,442,442 | A | * | 5/1969 | Seiwert | F01D 5/282 415/190 |
| 3,685,920 | A | * | 8/1972 | Burge | F04D 29/563 415/147 |
| 4,832,568 | A | * | 5/1989 | Roth | F01D 9/042 415/189 |

(Continued)

FOREIGN PATENT DOCUMENTS

| EP | 0513958 A2 | 11/1992 |
| EP | 2339120 A1 | 6/2011 |

(Continued)

OTHER PUBLICATIONS

European Search Report from corresponding European Application No. EP14175924.1, dated Apr. 23, 2015.

*Primary Examiner* — Ninh H Nguyen
(74) *Attorney, Agent, or Firm* — Polster Lieder

(57) ABSTRACT

The invention relates to an angular sector of a bladed stator of a low-pressure compressor of an axial turbine engine. The sector comprises an outer shroud and an inner shroud in the form of circular arcs intended to be mounted in a concentric manner on the outer casing of the turbine engine compressor. The sector likewise comprises a row of stator vanes extending radially and anchored in the shrouds in such a manner as to form a bladed box. The vanes of the box comprise anchoring lugs at their outer ends, the lugs being disposed in the thickness of the outer shroud. The inner shroud comprises stubs for anchoring vanes.

18 Claims, 4 Drawing Sheets

(56) References Cited

U.S. PATENT DOCUMENTS

| | | | | |
|---|---|---|---|---|
| 4,897,021 | A * | 1/1990 | Chaplin | F01D 5/22 267/160 |
| 5,083,900 | A * | 1/1992 | Carletti | F01D 9/042 415/191 |
| 6,234,750 | B1 * | 5/2001 | Mielke | F01D 25/246 415/189 |
| 6,371,725 | B1 * | 4/2002 | Manteiga | F01D 5/14 415/209.4 |
| 8,573,948 | B2 * | 11/2013 | Jevons | F01D 5/147 416/233 |
| 2011/0150643 | A1 * | 6/2011 | Wery | F01D 5/282 415/200 |
| 2013/0034434 | A1 * | 2/2013 | Propheter-Hinckley | F01D 9/042 415/208.1 |
| 2014/0377070 | A1 * | 12/2014 | Castro | F01D 5/063 416/174 |

FOREIGN PATENT DOCUMENTS

| | | |
|---|---|---|
| EP | 2472059 A1 | 7/2012 |
| WO | 2013141941 A1 | 9/2013 |

* cited by examiner

GUIDE VANE ASSEMBLY VANE BOX OF AN AXIAL TURBINE ENGINE COMPRESSOR

CROSS-REFERENCE TO RELATED APPLICATIONS

This application claims the benefit, under 35 U.S.C. §119, of EP 14175924.1, filed Jul. 7, 2014, the disclosure of which is incorporated herein by reference in its entirety.

FIELD

The invention relates to a bladed stator for an axial turbine engine. More specifically, the invention relates to an angular sector of an axial turbine engine stator forming a bladed box. The invention also relates to a turbine engine provided with a stator having an angular sector forming a bladed box.

BACKGROUND

The function of guiding a flow in an axial turbine engine is guaranteed by portions of stators provided with vanes. In particular, a flow is diverted in an axial compressor with the help of guide vane assemblies provided with vanes extending between concentric shrouds. The outer shroud is fixed to an outer casing and the inner shroud is attached to the inner casing via the vanes.

In order to relieve the stator, it is known in the art for certain shrouds to be realized in composite material. In order to simplify assembly of the stator, the shrouds may be semi-shrouds or they may be shroud sectors that extend over an angular fraction of the turbine engine. However, this can reduce the rigidity of the stator.

Document EP 2 339 120 A1 discloses the architecture of a guide vane assembly of an axial turbine engine with bladed boxes. The boxes are in the form of aviation vanes that are attached to inner and outer shrouds. The boxes thereby formed are fixed to the outer casing of the compressor with the help of structuring vanes disposed between the bladed boxes. However, the rigidity of a stator of this kind remains limited.

SUMMARY

The object of the invention is to solve at least one of the problems posed by the prior art. An object of the invention is also to improve the rigidity of an angular sector of the stator forming a bladed box. A further object of the invention is to improve the torsional rigidity of an angular sector of the stator forming a bladed box.

The invention relates to an angular sector of a bladed stator of an axial turbine engine, particularly of a compressor, wherein the sector comprises an outer shroud in the form of a circular arc intended to be mounted on a casing of the turbine engine, an inner shroud in the form of a circular arc, and a row of stator vanes extending radially and anchored in the shrouds in such a manner as to form a bladed box. Notably, at least one vane of the box comprises an anchoring lug disposed in the thickness of one of the shrouds in such a manner as to anchor the vane to the shroud to make the box rigid.

According to various advantageous embodiments of the invention, each box vane comprises a vane extending between the shrouds in the radial direction, the anchoring lugs extending perpendicularly to the radial direction and generally perpendicular in respect of the chord of the associated vane airfoil.

According to various advantageous embodiments of the invention, the anchoring lugs disposed at the same vane end are generally flat and generally curved or are parallel or staggered one in respect of the other according to the chord of the vane.

According to various advantageous embodiments of the invention, at least one of the shrouds comprises a row of openings where the vanes are anchored, at least one anchoring lug being disposed in the opening of the side radially opposite the other of the two shrouds.

According to various advantageous embodiments of the invention, the anchoring lugs extend in the direction of neighboring vanes over most of the width of the spaces between the neighboring vanes. In various embodiments, the anchoring lugs occupy the totality of the width of the spaces between the neighboring vanes.

According to various advantageous embodiments of the invention, at least one or each anchoring lug is flush with the surface of the associated shroud. In various embodiments, each vane end comprises at least one anchoring lug.

According to various advantageous embodiments of the invention, at least one of the shrouds, e.g. the outer shroud, is realized in a composite material with an organic matrix and a fibrous preform and/or at least one of the shrouds, e.g., the inner shroud, is realized in a composite material with an organic matrix and fibres generally directed in a random manner or short fibres, and fibres of the preform can join two neighboring vanes.

According to various advantageous embodiments of the invention, the sector comprises between three and six box vanes, for example, the sector can comprise four box vanes made of metal, e.g., titanium.

According to various advantageous embodiments of the invention, the shrouds are in the form of strips of material with constant thicknesses between the box vanes upstream to downstream, the sector comprising an annular layer of abradable material on the inner surface of the inner shroud. In various embodiments, the abradable layer covers the inner ends of the box vanes.

According to various advantageous embodiments of the invention, each box vane comprises at least two anchoring lugs at at least one of the respective box vane radial ends. In various embodiments, one of the two anchoring lugs can be situated on the front side of the vane at one of the two axial ends of the vane and the other of the two anchoring lugs can be situated on the back side of the vane at the other of the two axial ends of the vane.

According to various advantageous embodiments of the invention, the box vanes comprise at least two anchoring lugs disposed at a same radial end and a link between the at least two anchoring lugs. In various embodiments, the link can extend parallel to the profile of the vane.

According to various advantageous embodiments of the invention, the other of the two shrouds, e.g., the inner shroud, comprises anchoring stubs projecting in respect of the other of the two shrouds towards the vanes, the vanes being anchored to the stubs in such a manner as to be anchored to the other of the two shrouds.

According to various advantageous embodiments of the invention, the shrouds and the stator vanes define channels to divert a flow in the turbine engine.

According to various advantageous embodiments of the invention, the fibres of at least one or each preform are generally oriented at +45° and −45° in respect of the axial direction of the turbine engine.

According to various advantageous embodiments of the invention, the short fibres can have lengths of less than 5.00 mm, e.g., less than 1.00 mm.

According to various advantageous embodiments of the invention, the anchoring lugs of each vane are disposed on an axis exhibiting an inverse inclination of the chord of the vane in respect of the rotational angle of the turbine engine.

According to various advantageous embodiments of the invention, the shrouds are adapted to delimit between them a channel to guide an angular portion of annular flow in the turbine engine.

According to various advantageous embodiments of the invention, the numerical majority of fibres in the preform between the box vanes extend from one vane opening to the neighboring vane opening.

According to various advantageous embodiments of the invention, the vanes comprise airfoils extending between the shrouds, each vane comprising a leading edge, a trailing edge, a front surface and a back surface, wherein the surfaces extend from the leading edge to the trailing edge, the stubs being disposed in the extension of the vanes.

According to various advantageous embodiments of the invention, the radial height of at least one or each stub is greater than the maximum thickness of the associated stub. In various embodiments, the radial height of at least one or each stub is greater than the width of the vane.

The width of the vane is measured perpendicularly to its chord. For example, for a given profile, it may be the point of the vane furthest away from the chord.

According to various advantageous embodiments of the invention, the length of each anchoring lug is greater than the average width of the vane.

The length of a lug can be its main dimension and/or measured perpendicularly to the chord of the vane and/or by the circumference of the stator.

According to various advantageous embodiments of the invention, the composite material comprises an organic resin, e.g., PEI or PEEK, and carbon fibres or glass fibres.

According to various advantageous embodiments of the invention, at least one or each anchoring lug is longer than it is wide.

According to various advantageous embodiments of the invention, the angular sector describes less than a semicircle, e.g., less than an eighth of a circle, for example, less than a twentieth of a circle.

The presence of an anchoring lug on a box vane is not an essential aspect of the invention.

The invention likewise relates to an angular sector of a bladed stator of an axial turbine engine, for example, of a compressor, wherein the sector comprises an outer shroud in the form of a circular arc intended to be mounted on a casing of the turbine engine, an inner shroud in the form of a circular arc, and a row of stator vanes extending radially between the shrouds, the vanes being anchored to the shrouds in such a manner that the sector forms a bladed box capable of delimiting a channel between the shrouds. Notably, at least one or each shroud comprises an anchoring stub of one of the box vanes, the stub being in the radial extension of the vane projecting into the channel.

According to various advantageous embodiments of the invention, the shroud or each shroud comprises a plurality of vane anchoring stubs disposed in a row, the anchoring stubs being sockets in which the vanes are anchored and/or the stubs comprise wings enveloped by the vanes.

The invention likewise relates to a turbine engine comprising angular stator sectors. Notably, at least one or each sector conforms to the invention, the turbine engine comprising a casing on which are fixed the angular sectors and joint vanes placed between the stator sectors so as to form an alternating configuration, the joint vanes being fixed to the casing and to the stator sectors.

According to various advantageous embodiments of the invention, the casing is a composite outer casing with an organic matrix and a fibrous reinforcement with a stack of fibrous layers, the bladed box being fixed to the outer casing, at least one or each outer shroud comprising fixing openings to the outer casing, that can be provided with metal eyelets, the openings being disposed between the vanes of the box.

The invention allows the rigidity of the box and of the stator to be increased. In various embodiments, the rigidity of the box and of the stator can be increased independently of the presence of the joint vanes. The detailed configuration of the anchoring lugs increases the block effect. In fact, the placement of the anchoring lugs creates an inner fitting in the thickness of the shrouds. In the case of (a) composite shroud(s), the lugs complete the reinforcing action of the fibres in the matrix. The anchoring lugs limit the switching of the vanes in respect of the shrouds, just like circumferential movements of one shroud in respect of the other.

The two-lugged architecture with at least one of the vane ends, on the outside for example, can allow a chain to be designed crossing the associated shroud. The use of an anchoring lug limits the space taken up by the anchoring in a shroud, which allows the mechanical resistance of the shroud to be preserved while at the same time improving rigidity.

DRAWINGS

DETAILED DESCRIPTION

In the following description, the terms "inner" or "internal" and "outer" or "external" relate to a position in respect of the rotational axis of an axial turbine engine.

Figure 1:
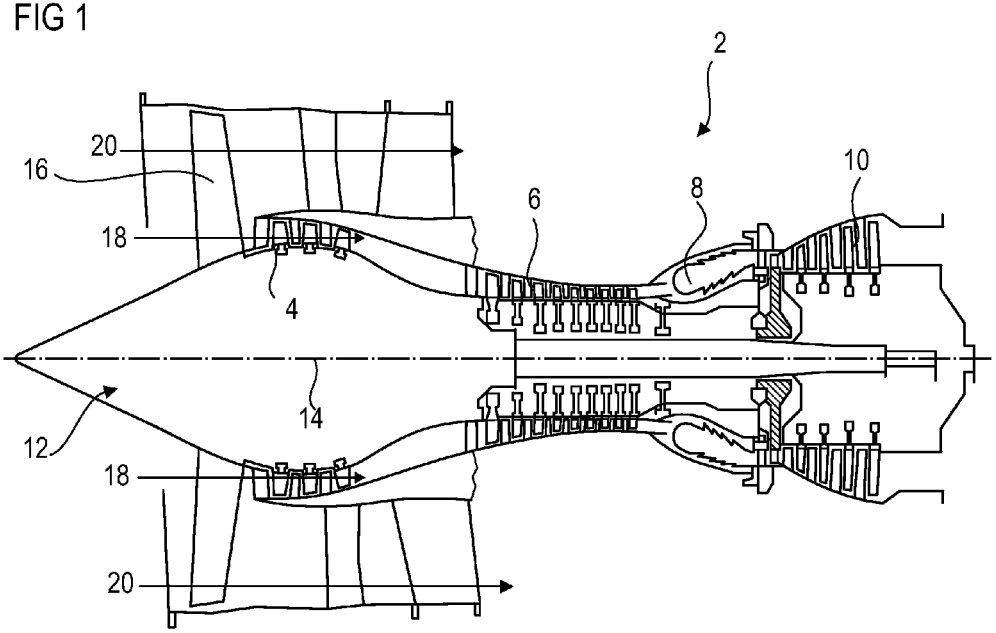
FIG. 1 represents an axial turbine engine according to various embodiments of the invention.

FIG. 1 depicts an axial turbine engine in simplified form. In this particular case it is a double-flow turbojet engine. The turbojet engine 2 comprises a first compression level referred to as a low-pressure compressor 4, a second compression level referred to as a high-pressure compressor 6, a combustion chamber 8 and one or a plurality of turbine levels 10. During operation, the mechanical power of the turbine 10 transmitted via the central shaft to the rotor 12 sets the two compressors 4 and 6 in operation. A gear reduction means can increase the rotational speed transmitted to the compressors 4 and 6. Or also, the different turbine stages can each be connected to the compressor stages via concentric shafts. The compressor stages comprise a plurality of rows of rotor blades associated with rows of stator vanes. The rotation of the rotor about its rotational axis 14 thereby allows an air flow rate to be generated and progressively compressed up to the inlet of the combustion chamber 8.

An input blower commonly referred to as a fan 16 is coupled with the rotor 12 and generates an air flow that divides up into a primary flow 18 crossing the different levels of the turbine engine mentioned above and a secondary flow 20 crossing an annular conduit (partially represented) along the engine, after which it joins up with the primary flow again at the turbine outlet. The secondary flow 20 can be accelerated so as to generate a reaction. The primary flow 18 and secondary flow 20 are annular flows; they are channelled through the casing of the turbine engine. To this end, the casing exhibits cylindrical walls or shrouds that can be inner or outer.

Figure 2:
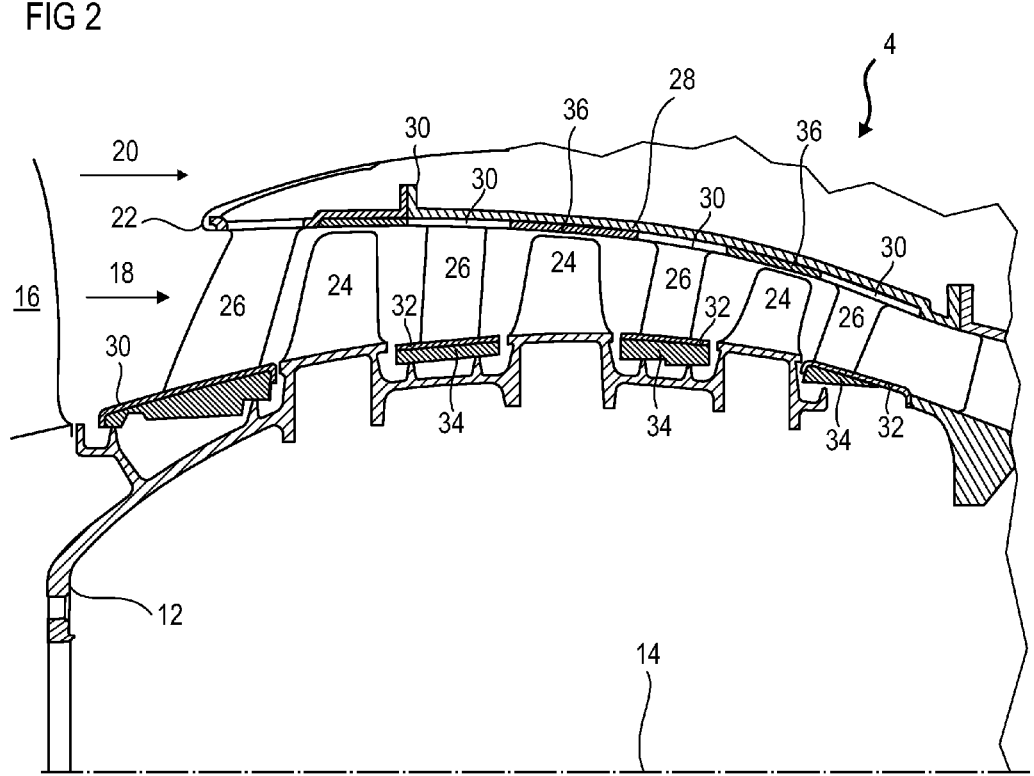
FIG. 2 is a diagram of a turbine engine compressor according to various embodiments of the invention.

FIG. 2 is a sectional view of a compressor of an axial turbine engine such as that shown in FIG. 1. The compressor can be a low-pressure compressor 4. It is possible to see here part of the fan 16 and the separation spout 22 of the primary flow 18 and of the secondary flow 20. The rotor 12 comprises a plurality of rows of rotor blades 24, in this case three.

The low-pressure compressor 4 comprises a plurality of guide vane assembles, in this case four, which each containing a row of stator vanes 26. The guide vane assemblies are associated with the fan 16 or with a row of rotor blades 24 to guide the flow of air, so as to convert the flow speed rate into pressure.

The stator vanes 26 are regularly spaced relative to one another and exhibit the same angular orientation in the flow. The space between the vanes, just as their angular orientation, can vary locally. Certain vanes can differ from the rest of the vanes in their row.

The turbine engine 2 can comprise a stator with a casing 28, for example an outer compressor casing. The casing 28 can be of metal, such as a titanium alloy, or realized in a composite material. The casing 28 comprises a circular wall that can be attached to the intermediate casing of the turbine engine with the help of an annular flange. The casing can likewise form a mechanical link supporting the separation spout, thanks to an annular flange. The casing can be formed from die halves.

The casing 28 further supports the stator vanes 26. The casing 28 can support the vanes 26 directly or via outer shrouds 30. The outer shrouds 30 act as a fixing support for the stator vanes 26 which themselves support the inner shrouds 32 at their inner ends. Layers of abradable material 34 can be applied to the inside of the inner shrouds 32. Other layers of abradable material 36 can be applied to the inner surface of the casing 28, for example, between the outer shrouds 30 that form shoulders.

Figure 3:
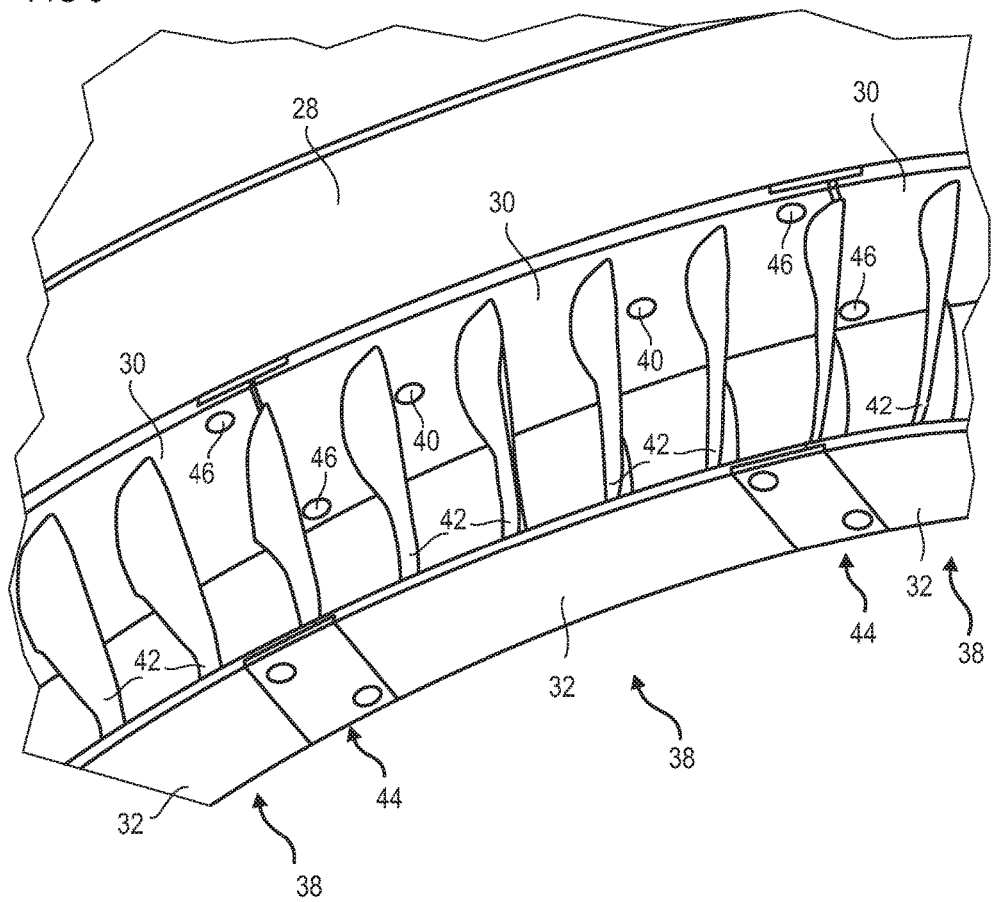
FIG. 3 illustrates a turbine engine casing with a stator according to various embodiments of the invention.

FIG. 3 depicts a stator portion, such as a portion of an annular row of stator vanes fixed to the casing. The stator is viewed from the inside. The layer of abradable material applied to the inner shroud is not shown. Portions of box vanes can cross the inner shrouds; however, these portions are not represented.

The stator comprises bladed angular sectors 38 which comprise a plurality of vanes. An angular sector can be understood to be an angular portion or an angular fraction of the rotation of a stator stage. The angle being considered is relative to the rotational axis 14 of the turbine engine. The angular sectors 38 can be bladed boxes 38 or bladed angular segments. They can be disposed end to end in such a manner as to describe a circle. The sectors 38 can be fixed to the casing 28 with the help of fixing openings 40 disposed between their vanes. The sectors 38 can likewise be in contact with the circumference and, in various embodiments, fixed one to the other.

Each box 38 or sector 38 can form a structure in which each joint between a vane and one of the shrouds (30; 32), e.g., each shroud (30; 32), is formed by an anchoring or a sealing. The anchoring allows a vane to be consolidated and immobilized in respect of a shroud.

In various embodiments, the stator can comprise at least two types of stator vanes, namely box vanes 42 and joint vanes 44 disposed between the boxes 38. The joint vanes 44 can form mechanical links between the boxes 38, and their presence is optional. The circumferential ends of the shrouds (30; 32) can exhibit fixing openings 46 to the joint vanes 44. In particular, the outer shrouds 30 can exhibit at their ends, according to the circumference, openings allowing them to be joined to the casing 28 and the joint vanes 44, for example with the help of their fixing platforms.

Figure 4:
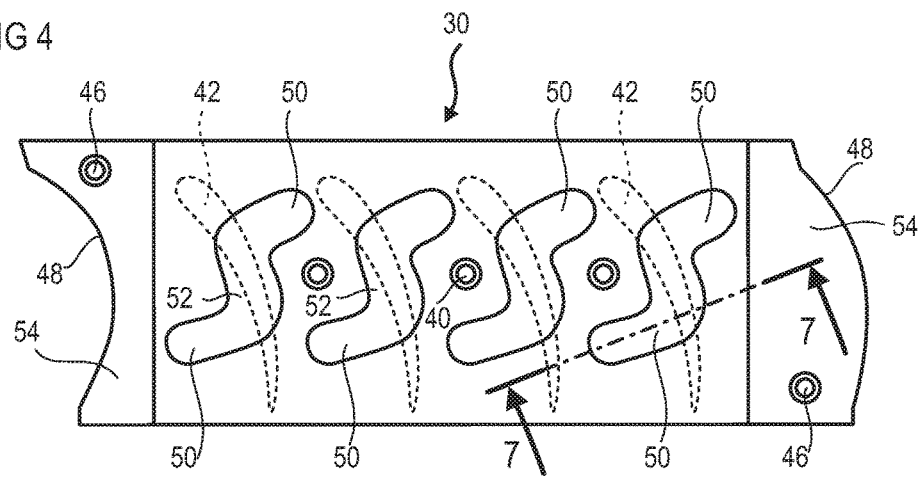
FIG. 4 illustrates a shroud according to various embodiments of the invention.

FIG. 4 depicts a bladed box shroud, for example an outer shroud 30 viewed from the outside. This shroud could likewise be an inner shroud viewed from the inside, for example, by adapting the angular orientation of the vanes.

The shroud 30 forms a sector or a segment. It can exhibit the form of a strip of material with an axial length and/or a constant thickness. The sections of its ends 48 according to the circumference can be curved to correspond to a joint vane profile, for example.

In order to be fixed, for example by anchoring to one of the shrouds, e.g., to each shroud, at least one box vane 42 can comprise at least one anchoring lug 50 at one of its radial ends. In various embodiments, at least one or each vane 42 can comprise two anchoring lugs 50 on the same radial side of the vane or at least two anchoring lugs on each radial vane end. At least one or each vane can possibly comprise at least one anchoring lug at each radial end.

At least one box vane 42 or each box vane 42 can comprise on the radially outer side two anchoring lugs 50, for example, one on the front side, e.g., in the downstream half of the vane or axially at the level of the trailing edge, and the other of the two anchoring lugs 50 on the back side, e.g., in the upstream half of the vane 42 or axially at the level of the leading edge.

The anchoring lugs 50 can extend mainly in the circumferential direction. They can extend in the direction of the neighboring vane 42, e.g., perpendicularly to the chord of the associated radial vane end. At least each vane end comprises a link 52 between the at least two anchoring lugs. In various embodiments, the link 52 can extend parallel to the vane profile. At least one or each link 52 can exhibit a sectional continuity with the anchoring lugs 50, in such a manner as to reinforce them when dealing with a torsional or bending force.

The maximum distance between the anchoring lugs 50 can be greater than half of the associated vane end 42. This maximum distance can be measured on an axis that is inclined by more than 30° in respect of the chord of the corresponding radial vane end 42, for example, by more than 45°, for example by more than 60°.

The anchoring lugs 50 can be generally curved and/or generally flat to fit in the thickness of the shroud 30 and/or to overlap. The anchoring lugs 50 can extend in the direction of the neighboring vanes 42 over the majority, e.g., over the totality, of the width of the channels between the neighboring vanes.

The shroud 30 can exhibit linking zones 54 at its circumferential ends. These zones 54 can allow fixing to the joint vanes and to the casing via the openings 46, the openings being capable of replacing the openings 40 between the box vanes 42.

Figure 5:
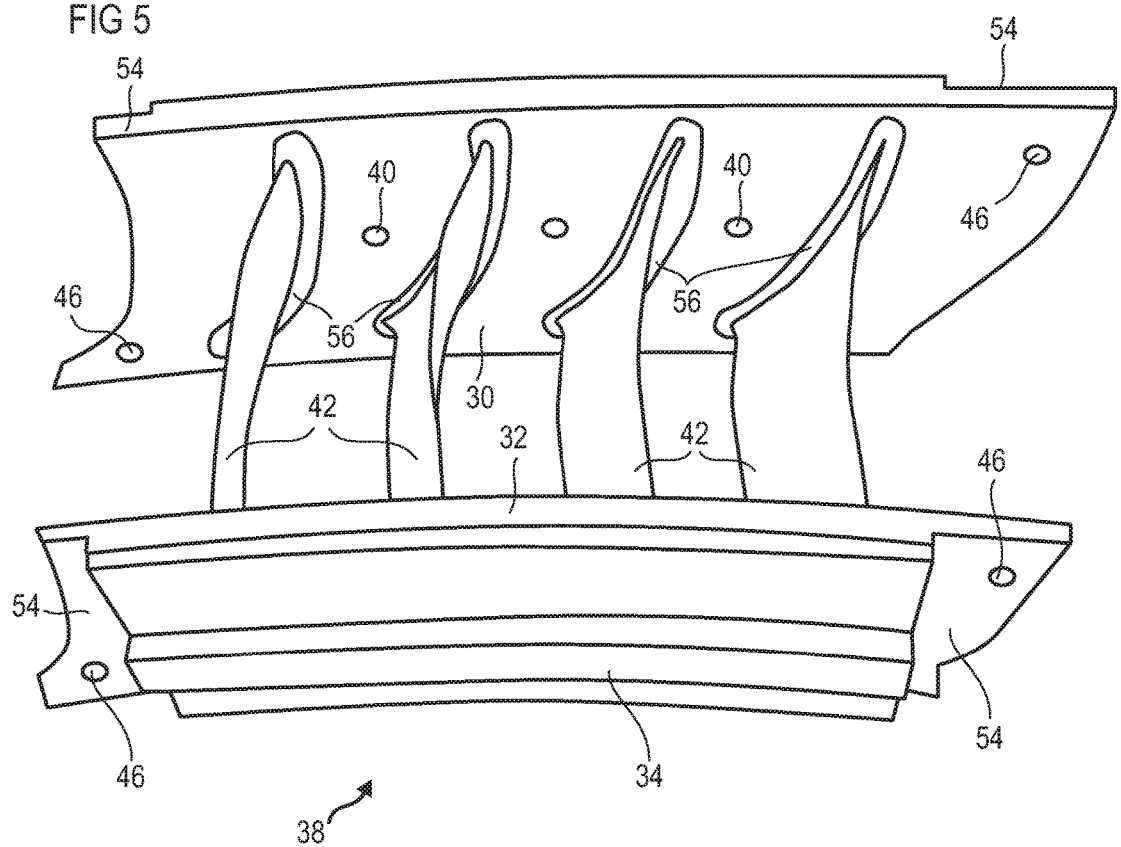
FIG. 5 illustrates a bladed box according to various embodiments of the invention.

FIG. 5 exhibits an angular sector 38 that forms a bladed stator box 38.

The circumferential ends of the shrouds (30; 32) can differ from one side to the other and from one shroud to the other. The linking zones 54 can be zones with a smaller thickness, for example to integrate in the thickness of the shrouds the thickness of the fixing platforms of the joint vanes. The zones with a smaller thickness 54 of the outer shroud 30 can be disposed on the outside and the zones with smaller thickness 54 of the inner shroud 32 can be disposed on the inside.

The sector 38 can comprise between two and ten, for example, between three and seven, for example four, vanes 42. These numbers allow the rigidity of a stage of stator vanes to be optimized, via the association of joint vanes and boxes 38. The vanes can be anchored in openings 56 formed in the shrouds (30; 32), the openings 56 can open out or form closed pockets.

The sector 38 can comprise a layer of abradable material 34 applied to the inner surface of the inner shroud 32. This layer 34 can be profiled to fit between ribs.

Figure 6:
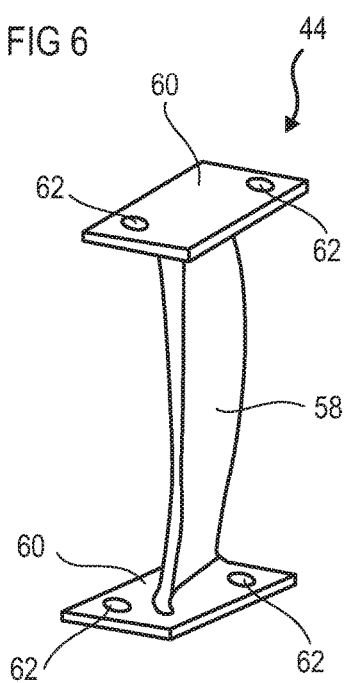
FIG. 6 illustrates a joint vane according to various embodiments of the invention.

FIG. 6 depicts a joint vane 44. The joint vane 44 comprises a body or vane 58 which extends in the turbine engine flow. It comprises at least one, e.g., at least two, fixing platforms 60, each at one of the radial ends of the vane 44. At least one or each platform 60 comprises at least one fixing opening 62. In various embodiments, the two platforms 60 can comprise at least two fixing openings, one on the front side of the vane, the other on the back side. The joint vane 44 can be made of metal, for example a titanium or aluminium alloy. It can be produced by forging, machining or additive fabrication.

The or each inner platform 60 can comprise a layer of abradable material (not shown) to present a continuity of circular material with the abradable layers of the boxes, in order to form a circular joint, such as the abradable layer shown in FIG. 2.

Figure 7:
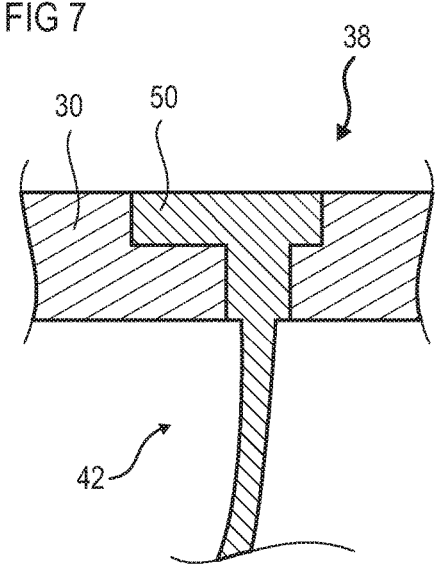
FIG. 7 illustrates a sectional view along section 7-7 drawn in FIG. 4 of an anchoring between an anchoring lug and a shroud according to various embodiments of the invention.

FIG. 7 depicts a section of the stator according to the axis 7-7 drawn in FIG. 4. A box vane 42 is visible with an anchoring lug 50 integrated in the thickness of a shroud, for example, the outer shroud 30.

At least one or each anchoring lug 50 can be integrated in the thickness of the shroud 30. The radial thickness of the anchoring lug 50 is smaller than or equal to the thickness of the shroud 30, e.g., smaller than or equal to half the thickness of the shroud. The outer surface of the anchoring lug can be flush with the outer surface of the shroud, e.g., forming a surface continuity. In various embodiments, the vane can comprise a radial link between the anchoring lug 50 and its aerodynamic vane is present in the flow.

At least one or each anchoring lug 50 can extend parallel to the shroud 30. The anchoring lug 50 can extend generally perpendicularly in respect of the stacking axis of the aerodynamic profiles of the vane. The position on the outside of the anchoring lug favors a radial retention of the shroud vane.

The description that has just been given is made in the context of an outer shroud; however, it can likewise be applied to an inner shroud, for example, by reversing in the radial direction.

Figure 8:
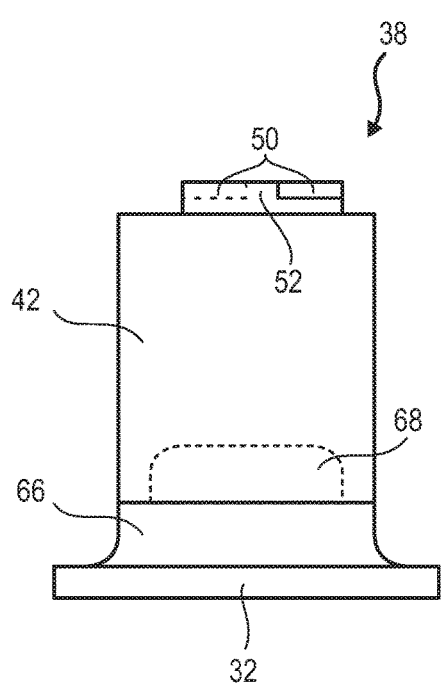
FIG. 8 depicts a vane fixed to a shroud stub of a bladed box according to various embodiments of the invention.

FIG. 8 represents an angular stator segment 38 according to the various embodiments of the invention. A box vane 42 is anchored to an inner shroud with the help of a stub 66. However, the presence of stubs 66 in the stator is optional, since a box vane or each box vane can be anchored to the two shrouds via anchoring lugs. The anchoring stub and the shroud being integrally formed or made in one piece.

One of the ends of at least one or of each box vane 42 can be fixed to one of the shrouds, for example the inner shroud 32, with the help of anchoring stubs 66. The shroud 32 can exhibit stubs 66 formed on its surface and extending towards the vane. Each stub 66 can exhibit an anchoring wing 68 in its extension, the surface whereof can be ribbed or pierced to increase anchoring, but the section whereof is smaller. The anchoring of the vanes 42 to the shrouds 32 can be mixed, one side of the vanes being anchored with the help of anchoring lugs 50, the other with the help of stubs 66.

Figure 9:
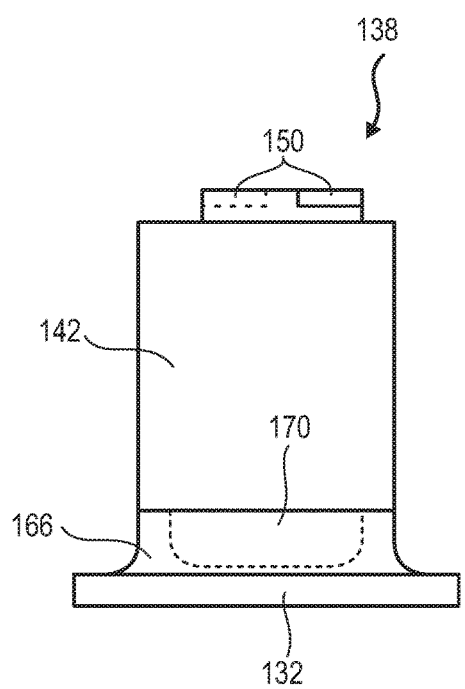
FIG. 9 depicts a vane fixed to a shroud stub of a bladed box according to various other embodiments of the invention.

FIG. 9 depicts a bladed angular sector 138 according to various other embodiments of the invention. This FIG. 9 reproduces the system of numbering used in the preceding figures for identical or similar components, the numbering being increased by 100, however. Specific numbers are used for specific components in this embodiment. A box vane 142 is anchored to a shroud with the help of a stub 166.

The shroud, for example an inner shroud 132, can be moulded on the end of at least one or of each box vane 142. At least one or each vane 142 can exhibit an end about which is formed an anchoring stub 166 of the shroud 132. The vanes can be of metal, such as titanium, and the shroud 132 can be of a polymer material, such as a composite material, with an organic matrix. At least one or each stub 166 can form a slot 170 in which is anchored the end of the box vane 142.

Figure 10:
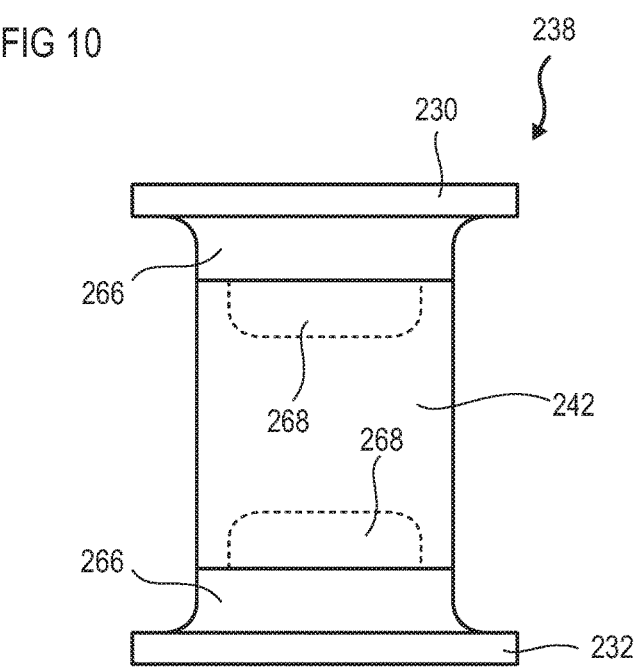
FIG. 10 depicts a bladed box according to various other embodiments of the invention.

FIG. 10 depicts a bladed angular sector 238 according to yet other various embodiments of the invention. This FIG. 10 reproduces the numbering system from the preceding figures for identical or similar components, the numbers being increased by 200, however. The box is depicted in axial section.

The sector 238 comprises two shrouds (230; 232) between which extend a plurality of box vanes 242. These vanes are anchored to the shrouds with the help of stubs 266 formed on the inner shroud 232 and the outer shroud 230. The stubs 266 extend radially one towards the other in the channel delimited by the sector. The stubs 266 can comprise anchoring slots and/or anchoring wings. The shrouds (230; 232) can be made of composite material and the vanes can be of titanium. The vanes 242 can possibly be of composite material.

The invention claimed is:

1. An angular sector of a bladed stator of an axial turbine engine, said sector comprising:
    an arcuate segment of an outer shroud intended to be mounted on a casing of the turbine engine;
    an arcuate segment of inner shroud; and
    a row of stator vanes extending radially from the outer shroud to the inner shroud, each of the stator vanes comprising an inner anchoring portion anchored to the inner shroud and an outer anchoring portion anchored to the outer shroud in such a manner that the stator vanes, the inner shroud and the outer shroud form a bladed box, wherein at least one anchoring portion of a box vane comprises an anchoring lug which mainly extends in the circumferential direction toward a neighboring vane over at least half the width of the space between the neighboring vanes, and which is disposed in the thickness of one of the shrouds in such a manner as to anchor the vane to the shroud to make the box rigid.

2. The angular sector in accordance with claim 1, wherein each box vane comprises an airfoil extending between the shrouds in the radial direction, the anchoring lugs extending perpendicularly to the radial direction and generally perpendicular in respect of a chord of the associated vane.

3. The angular sector in accordance with claim 1, wherein at least one box vane comprises two lugs disposed at a same end, the lugs being generally curved.

4. The angular sector in accordance with claim 1, wherein at least one box vane comprises two lugs disposed at a same end, the lugs being axially offset with respect of each other.

5. The angular sector in accordance with claim 1, wherein at least one of the shrouds comprises a row of openings where the vanes are anchored, at least one anchoring lug being disposed in the opening of the side radially opposite the other of the two shrouds.

6. The angular sector in accordance with claim 1, wherein at least one anchoring lug is flush with the outer surface of the bladed box.

7. The angular sector in accordance with claim 1, wherein each vane end comprises at least one anchoring lug.

8. The angular sector in accordance with claim 1, wherein at least one of the shrouds is made of a composite material with an organic matrix and a fibrous preform.

9. The angular sector in accordance with claim 8, wherein the preform comprises fibres joining two neighboring box vanes.

10. The angular sector in accordance with claim 1, wherein at least one of the shrouds is made of a composite material with an organic matrix and fibres generally directed in a random manner.

11. The angular sector in accordance with claim 1, wherein the angular sector comprises from three to six box vanes, the box vanes are made of metal including titanium.

12. The angular sector in accordance with claim 1, wherein each shroud forms a material strip with a constant thickness between the box vanes upstream to downstream, the sector comprising an annular layer of abradable material on the inner surface of the inner shroud, the abradable layer covering the inner ends of the box vanes.

13. The angular sector in accordance with claim 1, wherein each box vane comprises one anchoring lug situated downstream of a pressure side of the box vane, and one anchoring lug situated upstream of a suction side of the box vane.

14. The angular sector in accordance with claim 1, wherein each box vane comprises at least two anchoring lugs disposed at a same radial end and a link between the at least two anchoring lugs, the link extending parallel to the profile of the vane.

15. The angular sector in accordance with claim 1, wherein the shroud radially opposite the lug comprises anchoring stubs projecting in respect of the shrouds toward the lug, the vanes being anchored to the stubs in such a manner as to be anchored to the opposite shroud.

16. An angular sector of a bladed stator of an axial turbine engine, said sector comprising:
   an outer shroud in the form of a circular arc intended to be mounted on a casing of the turbine engine;
   an inner shroud in the form of a circular arc; and
   a row of stator vanes extending radially from the outer shroud to the inner shroud, each of the stator vanes comprising an inner anchoring portion anchored to the inner shroud and an outer anchoring portion anchored to the outer shroud, in such a manner that the stator vanes, the inner shroud and the outer shroud form a bladed box, wherein
     at least one shroud comprises an anchoring stub anchoring one box vane to the shroud, the stub forming a radial extension of the vane and projecting radially into the turbine engine flow, the anchoring stub and the shroud being integrally formed, the anchoring stub comprising a wing enveloped by the corresponding vane and extending over at least half the length of the stub.

17. The angular sector in accordance with claim 16, wherein the shroud comprises a plurality of vane anchoring stubs disposed in a row fashion, the anchoring stubs being sockets in which the vanes are anchored.

18. An axial turbine engine comprising:
   an outer casing with an annular inner surface;
   a plurality of angular stator sectors; and
   joint vanes placed between the stator sectors so as to form an alternating configuration, the joint vanes being fixed to the outer casing and to the stator sectors in order to link the stator sectors to the outer casing, at least one sector comprising:
     an arcuate outer shroud segment, the outer shroud segment comprising a main outer surface matching the casing inner surface;
     an arcuate inner shroud segment in the form of a circular arc; and
     a row of stator vanes extending radially from the outer shroud segment to the inner shroud segment, and anchored in the shroud segments in such a manner as to form a bladed box, wherein
       at least one box vane comprises an anchoring lug disposed in the thickness of one of the shroud segments in such a manner as to anchor the vane to the shroud segment to make the box rigid, the anchoring lug comprising an outer surface in contact with the annular inner surface of the outer casing.

* * * * *